United States Patent
Yang et al.

(10) Patent No.: US 9,576,695 B2
(45) Date of Patent: Feb. 21, 2017

(54) GRAPHENE-BASED LAMINATE INCLUDING DOPED POLYMER LAYER

(75) Inventors: Woo-Seok Yang, Seongnam-si (KR); Hyeong-Keun Kim, Yongin-si (KR); Tae-Young Kim, Seoul (KR)

(73) Assignees: Korea Electronics Technology Institute, Seongnam-si (KR); Hanwha Techwin Co., Ltd., Changwon-si (KR)

( * ) Notice: Subject to any disclaimer, the term of this patent is extended or adjusted under 35 U.S.C. 154(b) by 14 days.

(21) Appl. No.: 14/239,599

(22) PCT Filed: Aug. 30, 2012

(86) PCT No.: PCT/KR2012/006912
§ 371 (c)(1),
(2), (4) Date: Feb. 19, 2014

(87) PCT Pub. No.: WO2013/032233
PCT Pub. Date: Mar. 7, 2013

(65) Prior Publication Data
US 2014/0234627 A1    Aug. 21, 2014

(30) Foreign Application Priority Data
Aug. 30, 2011  (KR) .......... 10-2011-0087057

(51) Int. Cl.
  *B32B 9/00*   (2006.01)
  *H01B 1/04*   (2006.01)
  *B32B 27/06*  (2006.01)

(52) U.S. Cl.
  CPC ............ *H01B 1/04* (2013.01); *B32B 27/06* (2013.01); *Y10T 428/30* (2015.01)

(58) Field of Classification Search
None
See application file for complete search history.

(56) References Cited

U.S. PATENT DOCUMENTS

| | | | |
|---|---|---|---|
| 8,203,254 B2 * | 6/2012 | Takahashi | 310/328 |
| 2006/0174932 A1 * | 8/2006 | Usui et al. | 136/252 |
| 2008/0139710 A1 * | 6/2008 | Tsukada | C08J 3/09 524/100 |
| 2008/0192407 A1 * | 8/2008 | Lu | H01G 11/24 361/502 |

(Continued)

FOREIGN PATENT DOCUMENTS

| | | |
|---|---|---|
| CN | 101835609 A | 9/2010 |
| CN | 102067323 A | 5/2011 |

(Continued)

OTHER PUBLICATIONS

International Search Report (PCT/ISA/210) dated Jan. 31, 2013, issued in International Application No. PCT/KR2012/006912.

(Continued)

*Primary Examiner* — Humera Sheikh
*Assistant Examiner* — Seth Dumbris
(74) *Attorney, Agent, or Firm* — Sughrue Mion, PLLC

(57) ABSTRACT

A graphene-based laminate including a doped polymer layer is disclosed. The graphene-based laminate may include a substrate; a graphene layer disposed on the substrate and including at least one layer; and a doped polymer layer disposed on at least one surface of the graphene layer and including an organic dopant.

7 Claims, 2 Drawing Sheets

(56) References Cited

U.S. PATENT DOCUMENTS

| | | | |
|---|---|---|---|
| 2009/0068471 A1 | 3/2009 | Choi et al. | |
| 2009/0071533 A1* | 3/2009 | Choi | H01L 31/02246 136/252 |
| 2009/0155678 A1* | 6/2009 | Less | H01M 2/1673 429/144 |
| 2009/0242842 A1* | 10/2009 | Suh et al. | 252/500 |
| 2009/0246625 A1* | 10/2009 | Lu | 429/207 |
| 2009/0252967 A1* | 10/2009 | Yoon | H01B 1/24 428/408 |
| 2010/0035093 A1* | 2/2010 | Ruoff | H01G 11/36 429/493 |
| 2011/0143101 A1 | 6/2011 | Sandhu | |
| 2011/0151614 A1 | 6/2011 | Lochtman et al. | |
| 2011/0253946 A1* | 10/2011 | Huh | H01B 1/124 252/501.1 |
| 2012/0070612 A1* | 3/2012 | Lee et al. | 428/141 |
| 2012/0256138 A1 | 10/2012 | Suh et al. | |
| 2012/0261612 A1 | 10/2012 | Suh et al. | |
| 2012/0277360 A1* | 11/2012 | Scheffer | C09D 177/00 524/237 |

FOREIGN PATENT DOCUMENTS

| | | |
|---|---|---|
| JP | 2011-121828 A | 6/2011 |
| KR | 10-2011-0036543 A | 4/2011 |
| KR | 10-2011-0040223 A | 4/2011 |
| KR | 1020110073222 A | 6/2011 |
| KR | 10-1166528 B1 | 7/2012 |
| WO | 2009/152146 A1 | 12/2009 |

OTHER PUBLICATIONS

Written Opinion (PCT/ISA/237) dated Jan. 31, 2013, issued in International Application No. PCT/KR2012/006912.

Communication dated Aug. 4, 2015, issued by the State Intellectual Property Office of P.R. China in counterpart Chinese Application No. 201280042456.3.

* cited by examiner

GRAPHENE-BASED LAMINATE INCLUDING DOPED POLYMER LAYER

TECHNICAL FIELD

The present disclosure relates to a graphene-based laminate, and more particularly, to a graphene-based laminate including a doped polymer layer that may control conductivity of a graphene layer and protect the graphene layer of the graphene-based laminate.

BACKGROUND ART

Graphene is a material with high conductivity and stable electric, mechanical and chemical characteristics. Graphene has about 100 times higher electron mobility than silicon and about 100 times higher current flow rate than copper. Therefore, recently there has been much research into various aspects of graphene.

Graphene consists of only carbons having relatively small atomic weights, and thus is easily processable into 1- or 2-dimentional nanopatterns. This may be applied to control semi-conductive or conductive characteristics of a material, and to manufacture a wide range of functional devices, such as sensors and memory devices, based on a variety of chemical bonds of carbons.

The field of transparent electrodes is one application field of graphene with rapidly increasing marketability. Due to the long use of indium tin oxide (ITO) as a major transparent electrode material, problems have arose such as indium resource depletion and an increase in costs. Furthermore, indium is breakable and thus is not be applicable in flexible products that are foldable or extensible. For these reasons, there has been an increasing need for the development of graphene as an alternative to indium.

However, efficient synthesis and transfer of graphene, or appropriate dopants are not yet available, so that currently available graphene-based electrode devices fail to ensure satisfactory quality and scale required in practical production.

DETAILED DESCRIPTION OF THE INVENTION

Technical Problem

The present invention provides a graphene-based laminate including a doped polymer layer that may control conductivity of a graphene-layer and protect the graphene layer of the graphene-based laminate.

Technical Solution

According to an aspect of the present invention, a graphene-based laminate includes: a substrate; a graphene layer disposed on the substrate and comprising at least one layer; and a doped polymer layer disposed on at least one surface of the graphene layer and comprising an organic dopant.

The substrate may have transparency, flexibility, extensibility characteristics, or a combination thereof.

The substrate may be manufactured using a polymer having a repeating unit that includes at least one selected from the group consisting of a substituted or unsubstituted alkenyl group, a substituted or unsubstituted ester group, a substituted or unsubstituted ether group, a substituted or unsubstituted acrylate group, a substituted or unsubstituted carbonate group, a substituted or unsubstituted styrene group, a substituted or unsubstituted amide group, a substituted or unsubstituted imide group, and a substituted or unsubstituted sulfone group. The substrate may be manufactured using cellulose, or a polymer including cellulose. The number of repeating units may be in a range of about 1 to about 500, and in some embodiments, about 1 to about 300. The polymer may be a homopolymer or a copolymer. For example, the polymer may be a homopolymer. A ratio of different repeating units in the copolymer may be appropriated controlled with a range commonly used in the art, for example, to a range of 0.01:0.99 to 0.99:0.01.

As used herein, the "alkenyl group" may be "a substituted or unsubstituted C2-C20 alkenyl group", for example, "a substituted or unsubstituted C2-C10 alkenyl group". The term "substituted" may refer to substitution with a halogen atom, a C1-C20 alkyl group substituted with a halogen atom (for example, $CF_3$, $CHF_2$, $CH_2F$, $CCl_3$, or the like), a hydroxy group, a nitro group, a cyano group, an amino group, an amidino group, a hydrazine, a hydrazone, a carboxyl group or a salt thereof, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, or a C6-C20 heteroarylalkyl group.

As used herein, the "ester group" refers to a group represented by —COOR, the "carbonate group" refers to a group represented by —OC(=O)(OR), the "amide group" refers to a group represented by —RC(=O)NR$_1$, the "imide group" refers to a group represented by —R$_1$C(=O)N(R)C(=O)R$_2$, and the "sulfone group" refers to a group represented by —RSO$_2$R$_1$. In these formulae, R, R$_1$, and R2 may be each independently a hydrogen, a C1-C10 alkyl group, or a C6-C20 aryl group.

As used herein, the "polymer including cellulose" refers to a polymer including cellulose and a polymer having a repeating unit including at least one selected from the group consisting of "a substituted or unsubstituted alkenyl group, a substituted or unsubstituted ester group, a substituted or unsubstituted ether group, a substituted or unsubstituted acrylate group, a substituted or unsubstituted carbonate group, a substituted or unsubstituted styrene group, a substituted or unsubstituted amide group, a substituted or unsubstituted imide group, and a substituted or unsubstituted sulfone group.

In some embodiments, the organic dopant of the doped polymer layer may be an ionic liquid, and the ionic liquid may include a compound represented by Formula 1 and/or Formula 2 below.

[Formula 1]

In Formula 1, R$_1$ and R$_2$ may be identical to or different from each other, and may each independently be a hydrogen, a substituted or unsubstituted C1-C16 alkyl group, a substituted or unsubstituted C2-C16 alkenyl group, a substituted or unsubstituted C2-C16 alkynyl group, a substituted or unsubstituted C3-C16 cycloalkyl group, a substituted or unsubstituted C6-C16 aryl group, or a substituted or unsubstituted C6-C20 heteroaryl group; and X$^-$ may indicate an anion of the ionic liquid.

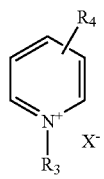

[Formula 2]

In Formula 2, $R_3$ and $R_4$ may be identical to or different from each other, and may each independently be a hydrogen, a substituted or unsubstituted C1-C16 alkyl group, a substituted or unsubstituted C2-C16 alkenyl group, a substituted or unsubstituted C2-C16 alkynyl group, a substituted or unsubstituted C3-C16 cycloalkyl group, a substituted or unsubstituted C6-C16 aryl group, or a substituted or unsubstituted C6-C20 heteroaryl group; and $X^-$ may indicate an anion of the ionic liquid.

With regard to Formula 1 and/or Formula 2, the term "substituted" refers to substitution with a halogen atom, a C1-C20 alkyl group substituted with a halogen atom (for example, $CF_3$, $CHF_2$, $CH_2F$, $CCl_3$, or the like), a hydroxy group, a nitro group, a cyano group, an amino group, an amidino group, a hydrazine, a hydrazone, a carboxyl group or a salt thereof, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, or a C6-C20 heteroarylalkyl group.

The cation in Formula 1 may include at least one selected from the group consisting of 1,3-dimethylimidazolium, 1,3-diethylimidazolium, 1-ethyl-3-methylimidazolium, 1-butyl-3-methylimidazolium, 1-hexyl-3-methylimidazolium, 1-octyl-3-methylimidazolium, 1-decyl-3-methylimidazolium, 1-dodecyl-3-methylimidazolium, and 1-tetradecyl-3-methylimidazolium.

The cation in Formula 2 may include at least one selected from the group consisting of 1-methylpyridinium, 1-ethylpyridinium, 1-butylpyridinium, 1-ethyl-3-methylpyridinium, 1-butyl-3-methylpyridinium, 1-hexyl-3-methylpyridinium, and 1-butyl-3,4-dimethylpyridinium.

The anion of the ionic liquid of Formula 1 or 2 may be an organic anion or an inorganic anion. For example, the anion of the ionic liquid of Formula 1 or 2 may include at least one selected from the group consisting of $Br^-$, $Cl^-$, $I^-$, $BF_4^-$, $PF_6^-$, $ClO_4^-$, $NO_3^-$, $AlCl_4^-$, $Al_2Cl_7^-$, $AsF_6^-$, $SbF_6^-$, $CH_3COO^-$, $CF_3COO^-$, $CH_3SO_3$, $C_2H_5SO_3^-$, $CH_3SO_4^-$, $C_2H_5SO_4^-$, $CF_3SO_3^-$, $(CF_3SO_2)_2N^-$, $(CF_3SO_2)_3C^-$, $(CF_3CF_2SO_2)_2N^-$, $C_4F_9SO_3^-$, $C_3F_7COO^-$, and $(CF_3SO_2)(CF_3CO)N^-$.

In some embodiments, the doped polymer layer may further include a polymer that is miscible with the ionic liquid. For example, the polymer miscible with the ionic liquid may include at least one selected from the group consisting of polyvinylalcohol, polymethylmethacrylate, polyethylene oxide, polypropylene oxide, polyvinylidene fluoride, and a copolymer thereof. A ratio of different repeating units in the copolymer may be appropriated controlled with a range commonly used in the art, for example, to a range of 0.01:0.99 to 0.99:0.01.

Advantageous Effects

As described above, according to the one or more embodiments of the present invention, a graphene-based laminate may include a doped polymer layer on at least one surface of a graphene layer to control the conductivity of the graphene layer. The doped polymer layer may protect and further stabilize the graphene layer.

BEST MODE

Hereinafter, embodiments of the present invention will be described in greater detail with reference to the appended drawings.

Figure 1:
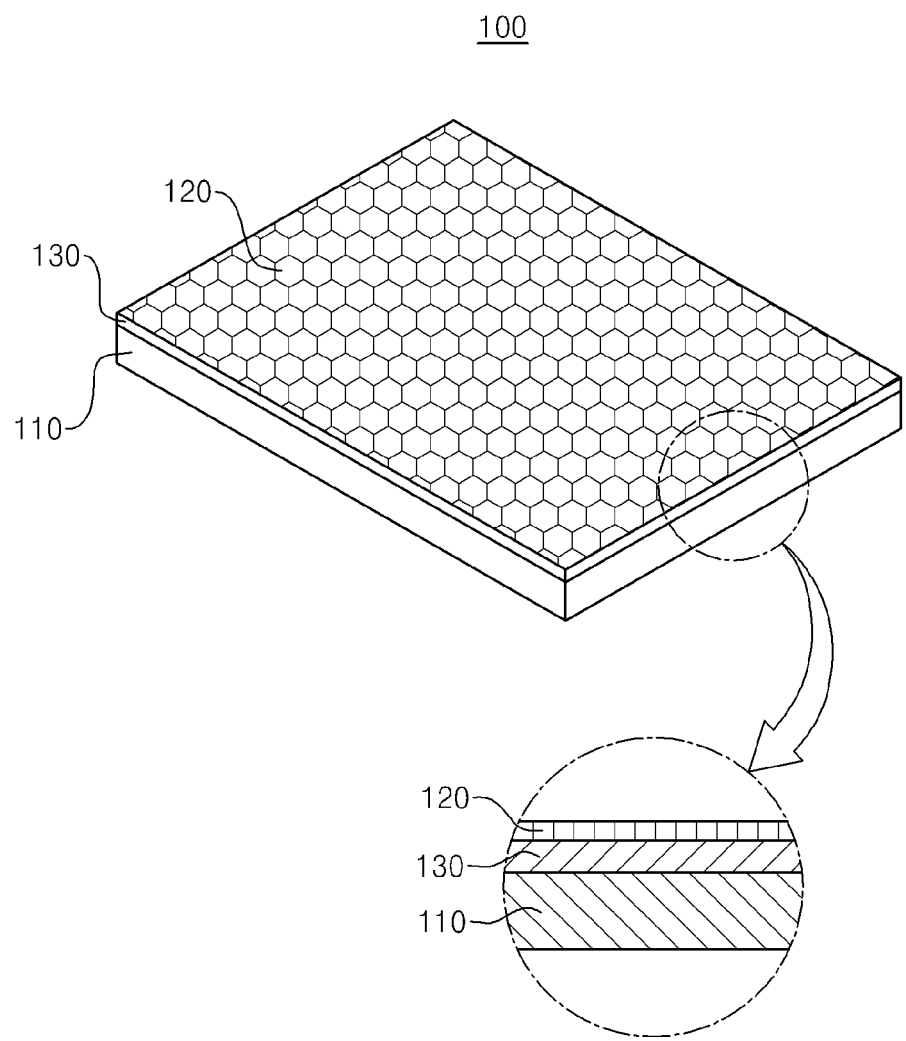
FIG. 1 is a schematic perspective view of a graphene-based laminate according to an embodiment of the present disclosure.
Figure 2:
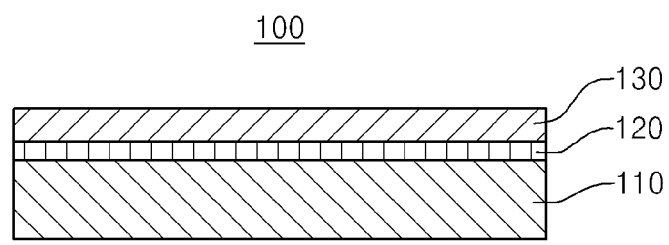
FIG. 2 is a cross-sectional view of the graphene-based laminate of FIG. 1, according to an embodiment of the present disclosure.
Figure 3:
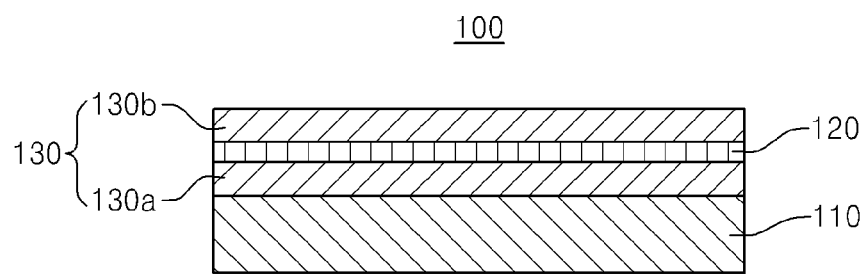
FIG. 3 is a cross-sectional view of the graphene-based laminate of FIG. 1, according to another embodiment of the present disclosure.

FIG. 1 is a schematic perspective view of a graphene-based laminate 100 according to an embodiment of the present disclosure. FIGS. 2 and 3 are cross-sectional views of the graphene-based laminate of FIG. 1, according to embodiments of the present disclosure.

Referring to FIG. 1, the graphene-based laminate 100 may include a substrate 110, a graphene layer 120 disposed on the substrate 110, and a doped polymer layer 130 disposed on at least one surface of the graphene layer 120.

The graphene-based laminate 100 may be used to manufacture an electrode of various electronic and electric devices (in particular, transparent electrode), such as next-generation electric field transistors or diodes, or the like, that require flexibility and/or extensibility characteristics, or a graphene transparent electrode for optoelectronic applications in the fields of solar cells, touch sensors, and electronic technologies in regard to which flexibility is an issue.

The substrate 110 may have transparency, flexibility, extendibility characteristics, or a combination thereof. The substrate 110 may include a polymer having a repeating unit that includes at least one selected from the group consisting of a substituted or unsubstituted alkenyl group, a substituted or unsubstituted ester group, a substituted or unsubstituted ether group, a substituted or unsubstituted acrylate group, a substituted or unsubstituted carbonate group, a substituted or unsubstituted styrene group, a substituted or unsubstituted amide group, a substituted or unsubstituted imide group, and a substituted or unsubstituted sulfone group. The number of repeating units may be in a range of about 1 to about 500, and in some embodiments, about 1 to about 300. The polymer may be a homopolymer or a copolymer. For example, the polymer may be a homopolymer. A ratio of different repeating units in the copolymer may be appropriated controlled with a range commonly used in the art.

As used herein, the "alkenyl group" may be "a substituted or unsubstituted C2-C20 alkenyl group", for example, "a substituted or unsubstituted C2-C10 alkenyl group". The term "substituted" may refer to substitution with a halogen atom, a C1-C20 alkyl group substituted with a halogen atom (for example, $CF_3$, $CHF_2$, $CH_2F$, $CCl_3$, or the like), a hydroxy group, a nitro group, a cyano group, an amino group, an amidino group, a hydrazine, a hydrazone, a carboxyl group or a salt thereof, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, or a C6-C20 heteroarylalkyl group.

As used herein, the "ester group" refers to a group represented by —COOR, the "carbonate group" refers to a group represented by —OC(=O)(OR), the "amide group" refers to a group represented by —RC(=O)NR$_1$, the "imide group" refers to a group represented by —R$_1$C(=O)N(R)C(=O)R$_2$, and the "sulfone group" refers to a group represented by —RSO$_2$R$_1$. In these formulae, R, R$_1$, and R$_2$ may be each independently a hydrogen, a C1-C10 alkyl group, or a C6-C20 aryl group.

As used herein, the "polymer including cellulose" refers to a polymer including cellulose and a polymer having a repeating unit including at least one selected from the group consisting of a substituted or unsubstituted alkenyl group, a substituted or unsubstituted ester group, a substituted or unsubstituted ether group, a substituted or unsubstituted acrylate group, a substituted or unsubstituted carbonate group, a substituted or unsubstituted styrene group, a substituted or unsubstituted amide group, a substituted or unsubstituted imide group, and a substituted or unsubstituted sulfone group.

The polymer for the substrate may be, for example, polymethyl methacrylate (PMMA), polyethyleneterephthalate (PET), polyethylenenaphthalate (PEN), polycarbonate (PC), or polyimide (PI).

The graphene layer 120 may be formed on the substrate 110. Methods of forming the graphene layer 120 on the substrate 110 will be described later.

The graphene layer 120 may be a layer or a sheet of graphene in which a plurality of carbon atoms are covalently linked to each other to form polycyclic aromatic molecules.

The carbon atoms covalently linked to one another may form, but not limited to, 6-membered rings, as illustrated in FIG. 1, as a basic repeating unit. The covalently linked carbon atoms also may form 5-membered rings, 7-membered rings, or the like.

The graphene layer 120 may be, but not limited to, a single layer. The graphene layer 120 also may be multiple layers. For example, the graphene layer 120 may be 2 to 50 layers.

The graphene layer 120 may have a large area, for example, with a length of about 1 mm to about 1000 m in a lateral or longitudinal direction.

The doped polymer layer 130 may be disposed on at least one surface of the graphene layer 120 and include an organic dopant. The doped polymer layer 130 may control the conductivity of the graphene layer 120 and may protect the graphene layer 120.

The doped polymer layer 130 may be disposed between the substrate 110 and the graphene layer 120, as illustrated in FIG. 1. However, embodiments of the present invention are not limited thereto. For example, the doped polymer layer 130 may be disposed on the graphene layer 120, as illustrated in FIG. 2. For example, the doped polymer layer 130 may include a first doped polymer layer 130a disposed between the substrate 110 and the graphene layer 120, and a second doped polymer layer 130b disposed on the graphene layer 120, as illustrated in FIG. 3. Methods of forming the doped polymer layer 130 will be described later.

The organic dopant in the doped polymer layer 130 may be an ionic liquid. The doled polymer layer 130 may further include a polymer.

The ionic liquid in the doped polymer layer 130 refers to a material consisting of ionic bonds but being present in liquid phase at room temperature. In other words, the ionic liquid is a salt of liquid phase consisting of ionic bonds and having various physical and chemical characteristics depending on a combination of cations and anions.

The ionic liquid may be chemically and thermally stable and may have high polarity and high ionic conductivity. The ionic liquid may serve as a dopant able to control an electronic state of graphene through interaction with the graphene.

In some embodiments, the ionic liquid in the doped polymer layer 130 in the graphene-based laminate 100 may include a compound represented by Formula 1 below.

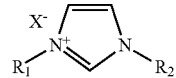

[Formula 1]

The ionic liquid of Formula 1 may be an imidazolium-based ionic liquid. In Formula 1, R1 and R2 may be identical to or different from each other, and each independently may be a hydrogen, a substituted or unsubstituted C1-C16 alkyl group, a substituted or unsubstituted C2-C16 alkenyl group, a substituted or unsubstituted C2-C16 alkynyl group, a substituted or unsubstituted C3-C16 cycloalkyl group, a substituted or unsubstituted C6-C16 aryl group, or a substituted or unsubstituted C6-C20 heteroaryl group; and X$^-$ may indicate an anion of the ionic liquid.

With regard to Formula 1, the term "substituted" refers to substitution with a halogen atom, a C1-C20 alkyl group substituted with a halogen atom (for example, CF$_3$, CHF$_2$, CH$_2$F, CCl$_3$, or the like), a hydroxy group, a nitro group, a cyano group, an amino group, an amidino group, a hydrazine, a hydrazone, a carboxyl group or a salt thereof, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, or a C6-C20 heteroarylalkyl group.

The cation in Formula 1 may include at least one selected from the group consisting of 1,3-dimethylimidazolium, 1,3-diethylimidazolium, 1-ethyl-3-methylimidazolium, 1-butyl-3-methylimidazolium, 1-hexyl-3-methylimidazolium, 1-octyl-3-methylimidazolium, 1-decyl-3-methylimidazolium, 1-dodecyl-3-methylimidazolium, and 1-tetradecyl-3-methylimidazolium.

The anion of Formula 1 may be an organic anion or an inorganic anion. For example, the anion of Formula 1 may include at least one selected from the group consisting of Br$^-$, Cl$^-$, I$^-$, BF$_4^-$, PF$_6^-$, ClO$_4^-$, NO$_3^-$, AlCl$_4^-$, Al$_2$Cl$_7^-$, AsF$_6^-$, SbF$_6^-$, CH$_3$COO$^-$, CF$_3$COO$^-$, CH$_3$SO$_3^-$, C$_2$H$_5$SO$_3^-$, CH$_3$SO$_4^-$, C$_2$H$_5$SO$_4^-$, CF$_3$SO$_3^-$, (CF$_3$SO$_2$)$_2$N$^-$, (CF$_3$SO$_2$)$_3$C$^-$, (CF$_3$CF$_2$SO$_2$)$_2$N$^-$, C$_4$F$_3$SO$_3^-$, C$_3$F$_7$COO$^-$, and (CF$_3$SO$_2$)(CF$_3$CO)N$^-$.

In some embodiments, the ionic liquid in the doped polymer layer 130 in the graphene-based laminate 100 may include a compound represented by Formula 2 below. In some other embodiments, the ionic liquid in the doped polymer layer 130 in the graphene-based laminate 100 may include a compound represented by Formula 2. In other embodiments, the ionic liquid in the doped polymer layer 130 in the graphene-based laminate 100 may include compounds represented by Formulae 1 and 2, or optionally may include the compound represented by Formula 2.

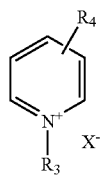

[Formula 2]

The ionic liquid of Formula 2 may be a pyridinium-based ionic liquid. In Formula 2, R3 and R4 may be identical to or different from each other, and each independently may be a hydrogen, a substituted or unsubstituted C1-C16 alkyl group, a substituted or unsubstituted C2-C16 alkenyl group, a substituted or unsubstituted C2-C16 alkynyl group, a substituted or unsubstituted C3-C16 cycloalkyl group, a substituted or unsubstituted C6-C16 aryl group, or a substituted or unsubstituted C6-C20 heteroaryl group; and $X^-$ may indicate an anion of the ionic liquid.

With regard to Formula 2, the term "substituted" refers to substitution with a halogen atom, a C1-C20 alkyl group substituted with a halogen atom (for example, $CF_3$, $CHF_2$, $CH_2F$, $CCl_3$, or the like), a hydroxy group, a nitro group, a cyano group, an amino group, an amidino group, a hydrazine, a hydrazone, a carboxyl group or a salt thereof, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, or a C6-C20 heteroarylalkyl group.

The cation in Formula 2 may include at least one selected from the group consisting of 1-methylpyridinium, 1-ethylpyridinium, 1-butylpyridinium, 1-ethyl-3-methylpyridinium, 1-butyl-3-methylpyridinium, 1-hexyl-3-methylpyridinium, and 1-butyl-3,4-dimethylpyridinium.

The anion of Formula 2 may be an organic anion or an inorganic anion. The anion in Formula 2 may include at least one of the same anions as those described above in conjunction with Formula 1, and a detailed description thereof will be omitted here.

In some embodiments, the doped polymer layer 130 of the graphene-based laminate 100 may further include a polymer that is miscible with the ionic liquid.

The polymer that is miscible with the ionic liquid is not specifically limited, and may be any polymer that is miscible with the ionic liquid. For example, the polymer miscible with the ionic liquid may include at least one selected from the group consisting of polyvinylalcohol, polymethylmethacrylate, polyethylene oxide, polypropylene oxide, polyvinylidene fluoride, and a copolymer thereof. A ratio of different repeating units in the copolymer may be appropriated controlled with a range commonly used in the art, for example, to a range of 0.01:0.99 to 0.99:0.01.

MODE OF THE INVENTION

Hereinafter, methods of manufacturing the graphene-based laminate 100, according to an embodiment of the present inventions, will be described.

In a method of manufacturing the graphene-based laminate 100, according to an embodiment of the present invention, first, graphene may be grown to form the graphene layer 120 on a first substrate. The first substrate, which serves as a seed layer for growing graphene, may be not limited to a specific material. For example, the first substrate may include at least one metal or an alloy selected from the group consisting of silicon (Si), nickel (Ni), cobalt (Co), iron (Fe), platinum (Pt), gold (Au), aluminum (Al), chromium (Cr), copper (Cu), magnesium (Mg), manganese (Mn), molybdenum (Mo), rhodium (Rh), tantalum (Ta), titanium (Ti), tungsten (W), uranium (U), vanadium (V), zirconium (Zr), brass, bronze, cupro nickel, stainless steel, and germanium (Ge).

The first substrate may include a catalyst layer to facilitate the growth of graphene. The catalyst layer may be not limited to a specific material. For example, the catalyst layer may be formed of a material that is the same as or different from the material of the first substrate. A thickness of the catalyst layer may not be specifically limited. The catalyst layer may be a thin or thick layer.

The graphene may be grown on the first substrate by common chemical vapor deposition (CVD). Examples of the CVD are rapid thermal chemical vapor deposition (RTCVD), inductively coupled plasma chemical vapor deposition (ICP-CVD), low pressure chemical vapor deposition (LPCVD), atmospheric pressure chemical vapor deposition (APCVD), metal organic chemical vapor deposition (MOCVD) and plasma enhanced chemical vapor deposition (PECVD).

For example, to form the graphene layer 120 on the first substrate, after the first substrate is loaded into a furnace, the first substrate may be thermally treated at a temperature of about 300° C. to about 2000° C. at an atmospheric pressure with supply of a reaction gas including a carbon source to grow graphene.

Examples of the carbon source are carbon monoxide, carbon dioxide, methane, ethane, ethylene, ethanol, acetylene, propane, butane, butadiene, pentane, pentane, pentene, cyclopentadiene, hexane, cyclohexane, benzene, and toluene.

Next, the graphene layer 120 grown on the first substrate may be transferred to the substrate 110, or to the substrate 110 having the doped polymer layer 130 disposed on thereof. In this regard, the doped polymer layer 130 may be formed on the substrate 110 by any of a variety of common coating methods, for example, spin coating, dip coating, or spray coating. For example, after a doped polymer including the ionic liquid and the polymer is dissolved in an appropriate organic solvent to prepare a coating solution, the coating solution may be coated onto the substrate 110 by spin coating and then dried to form the doped polymer layer 130.

The transferring of the graphene layer 120 may be performed by a direct or indirect transfer method. For example, the graphene layer 120 may be transferred to the substrate 110 by using a known roll-to-roll process. Hereinafter, for convenience of description, a method of transferring the graphene layer 120 to the substrate 110 by using the roll-to-roll process.

For example, the first substrate with the graphene layer 120 thereon and the substrate 110 may be passed together through a roller unit including a plurality of rollers disposed to be opposite to one another for lamination, and then through another roller unit (for example, including transfer rollers) to transfer the graphene layer 120 to the substrate 110 and at the same time to remove the first substrate via etching. The etching may be performed using an etching solution for selectively etching away the first substrate. The etching solution may be appropriately selected depending on a type of the first substrate.

In other words, while overlapping with one another such that the graphene layer 120 on the first substrate contacts the substrate 110, the first substrate with the graphene layer 120 thereon and the substrate 100 are passed through transfer rollers to transfer the graphene layer 120 on the first substrate to the substrate 100, and at the same time are passed through an etching solution for selectively etching away the first substrate, thereby transferring the graphene layer 120 onto the substrate 100 and removing the first substrate by using the etching solution.

The doped polymer layer 130 may be formed between the substrate 110 and the graphene layer 120. In some embodiments, the doped polymer layer 130 may be formed on the graphene layer 120 transferred on the substrate 110. In some other embodiments, the doped polymer layer 130 may be formed as two layers, whereby one of the layers is between the substrate 110 and the graphene layer 120, and the other layer is on the graphene layer 120 on the substrate. The doped polymer layer 130 may be formed using a known coating method.

As described above, according to the one or more embodiments of the present invention, the conductivity of a graphene layer may be controlled by forming a doped polymer layer on at least one surface of the graphene layer. The doped polymer layer may also protect and further stabilize the graphene layer.

While one or more embodiments of the present invention have been described with reference to the figures, it will be understood by those of ordinary skill in the art that various changes in form and details may be made therein without departing from the spirit and scope of the present invention as defined by the following claims.

INDUSTRIAL APPLICABILITY

A graphene-based laminate according to any of the above-described embodiments of the present disclosure may include a doped polymer layer disposed on at least one surface of a graphene layer to control the conductivity of the graphene layer. The doped polymer layer may also protect and further stabilize the graphene layer.

The invention claimed is:
1. A graphene-based laminate electrode comprising:
a substrate comprising (i) a polymer having a repeating unit that includes at least one selected from the group consisting of a substituted or unsubstituted alkenyl group, a substituted or unsubstituted ester group, a substituted or unsubstituted ether group, a substituted or unsubstituted acrylate group, a substituted or unsubstituted carbonate group, a substituted or unsubstituted styrene group, a substituted or unsubstituted amide group, a substituted or unsubstituted imide group, and a substituted or unsubstituted sulfone group, (ii) a cellulose, or (iii) a mixture thereof;
a first doped polymer sheet provided directly above the substrate;
a graphene layer provided directly above the first doped polymer sheet and comprising at least one layer; and
a second doped polymer sheet provided directly above the graphene layer,
wherein the first doped polymer sheet and the second doped polymer sheet comprise an organic dopant, and
wherein the organic dopant of the first and second doped polymer sheets is an ionic liquid, and the ionic liquid comprises a compound represented by Formula 1 and/or Formula 2:

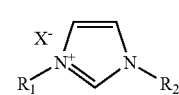
[Formula 1]

wherein, in Formula 1, $R_1$ and $R_2$ are identical to or different from each other, and are each independently a hydrogen, a substituted or unsubstituted C1-C16 alkyl group, a substituted or unsubstituted C2-C16 alkenyl group, a substituted or unsubstituted C2-C16 alkynyl group, a substituted or unsubstituted C3-C16 cycloalkyl group, a substituted or unsubstituted C6-C16 aryl group, or a substituted or unsubstituted C6-C20 heteroaryl group; and $X^-$ indicates an anion of the ionic liquid,

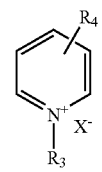
[Formula 2]

wherein, in Formula 2, $R_3$ and $R_4$ are identical to or different from each other, and are each independently a hydrogen, a substituted or unsubstituted C1-C16 alkyl group, a substituted or unsubstituted C2-C16 alkenyl group, a substituted or unsubstituted C2-C16 alkynyl group, a substituted or unsubstituted C3-C16 cycloalkyl group, a substituted or unsubstituted C6-C16 aryl group, or a substituted or unsubstituted C6-C20 heteroaryl group; and $X^-$ indicates an anion of the ionic liquid.

2. The graphene-based laminate electrode of claim 1, wherein the substrate has transparency, flexibility, extensibility characteristics, or a combination thereof.

3. The graphene-based laminate electrode of claim 1, wherein a cation in Formula 1 comprises at least one selected from the group consisting of 1,3-dimethylimidazolium, 1,3-diethylimidazolium, 1-ethyl-3-methylimidazolium, 1-butyl-3-methylimidazolium, 1-hexyl-3-methylimidazolium, 1-octyl-3-methylimidazolium, 1-decyl-3-methylimidazolium, 1-dodecyl-3-methylimidazolium, and 1-tetradecyl-3-methylimidazolium.

4. The graphene-based laminate electrode of claim 1, wherein a cation in Formula 2 comprises at least one selected from the group consisting of 1-methylpyridinium, 1-ethylpyridinium, 1-butylpyridinium, 1-ethyl-3-methylpyridinium, 1-butyl-3-methylpyridinium, 1-hexyl-3-methylpyridinium, and 1-butyl-3,4-dimethylpyridinium.

5. The graphene-based laminate electrode of claim 1, wherein the anion of the ionic liquid of Formula 1 and/or 2 is an organic anion or an inorganic anion, and comprises at least one selected from the group consisting of $Br^-$, $Cl^-$, $I^-$, $BF_4^-$, $PF_6^-$, $ClO_4^-$, $NO_3^-$, $AlCl_4^-$, $Al_2Cl_7^-$, $AsF_6^-$, $SbF_6^-$, $CH_3COO^-$, $CF_3COO^-$, $CH_3SO_3^-$, $C_2H_5SO_3^-$, $CH_3SO_4^-$, $C_2H_5SO_4^-$, $CF_3SO_3^-$, $(CF_3SO_2)_2N^-$, $(CF_3SO_2)_3C^-$, $(CF_3CF_2SO_2)_2N^-$, $C_4F_9SO_3^-$, $C_3F_7COO^-$, and $(CF_3O_2)(CF_3CO)N^-$.

6. The graphene-based laminate electrode of claim 1, wherein the first and second doped polymer sheets further comprises a polymer that is miscible with the ionic liquid, and the polymer comprises at least one selected from the group consisting of polyvinylalcohol, polymethylmethacrylate, polyethylene oxide, polypropylene oxide, polyvinylidene fluoride, and a copolymer thereof.

7. The graphene-based laminate electrode of claim 1, wherein the graphene-based laminate electrode has only one graphene layer.

* * * * *